Keith L. Nicodemus,
INVENTOR.

3,363,248
CHIRP RADAR TECHNIQUE FOR SUPPRESSING SECOND TIME AROUND ECHOES

Keith L. Nicodemus, Middletown, N.J., assignor, by mesne assignments, to the United States of America as represented by the Secretary of the Army
Filed Feb. 17, 1966, Ser. No. 529,597
3 Claims. (Cl. 343—17.2)

ABSTRACT OF THE DISCLOSURE

A method of eliminating second time around echoes in a chirp radar. Alternate pulses are up-chirped and down-chirped. An up-chirp is one that sweeps from a low to a higher frequency, and a down-chirp is one that sweeps from a high to a lower frequency. The radar receiver has respective compressors for up-chirp and down-chirp pulses.

---

Figures 1, 2:
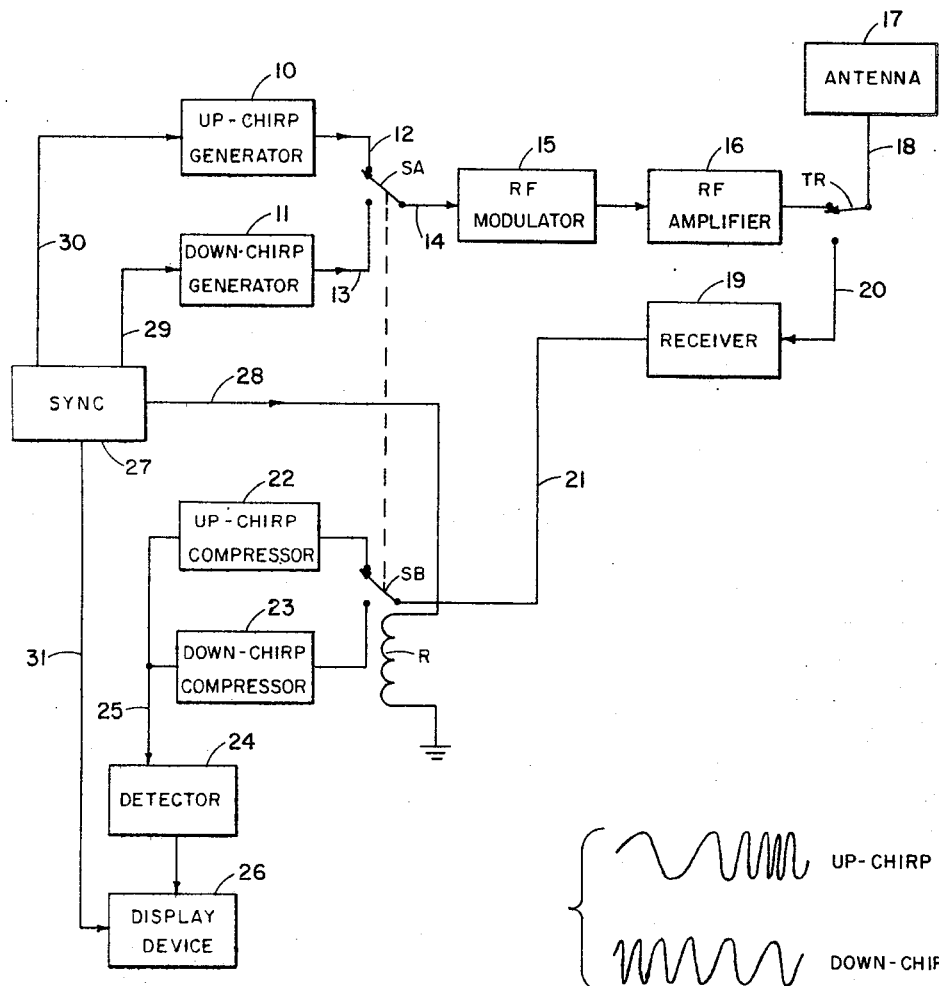

Second time around echoes are returns from a target at a range greater than the range of the radar at the pulse repetition frequency in use. Second time around echoes appear as false targets in that their indicated range is about half the distance to the target, dependent on the pulse width used. Also, such second time around echoes can obscure desired targets. At higher pulse repetition rates, the problem of second time around echoes can become acute.

The most common solution to the second time around echoes problem has been to jitter the pulse repetition rate or to lower the pulse repetition frequency. Jittering the pulse repetition rate does not eliminate second time around echoes but tends to smear the presentation of false target returns on the indicator. The presentation of true target returns is undistorted. While an operator can distinguish between true and false target returns, automatic tracking circuits cannot so distinguish. Lowering the pulse repetition frequency does eliminate second time around echoes but it reduces definition and adversely affects range tracking.

Another way in which second time around echoes may be eliminated is shown in U.S. Patent No. 2,933,700, in which two different pulse frequencies are alternately transmitted.

This invention disclosed herein is for use with a chirp radar system, and takes advantage of the characteristics of the chirp system. The operation of chirp radar systems is known and is described, for example, in the January 1965 issue of "Electronics World," beginning on page 42.

Briefly, a chirp radar, as opposed to a conventional pulse type radar may use a relatively wide pulse at a lesser maximum amplitude than the conventional pulse type radar, but with an equal amount of power. Each chirp pulse is swept in frequency as it is being transmitted. For reception, the chirp system uses a filter system which has a delay proportional to frequency so that the reflected chirp pulse is time compressed.

The present invention reduces second time around echoes by the method of up-chirping and down-chirping on alternate pulses, and switching receiver circuits in correspondence. Up-chirping and down-chirping, as their names imply, are respectively sweeping from a low to a higher frequency and sweeping from a high to a lower frequency. An echo from an up-chirp pulse would be compressed in an up-chirp compressor and expanded in a down-chirp compressor, and conversely, a down-chirp echo would be expanded in an up-chirp compressor and compressed in a down-chirp compressor.

An object of the invention is to suppress second time around echoes in a chirp radar.

Another object is to reduce, in a chirp radar, range errors caused by the Doppler effect.

Other objects and many of the attendant advantages of this invention will be readily appreciated by reference to the following detailed description when considered in connection with the accompanying drawings, in which:

FIGURE 1 shows an apparatus capable of performing the method of the invention; and FIGURE 2 shows typical waveforms of the up-chirp and down-chirp pulses.

Referring now to FIGURE 1, there are shown an up-chirp generator 10 and a down-chirp generator 11. The outputs of these generators are fed through conductors 12 and 13 to switch SA, and thence through conductor 14 to RF modulator 15 and into RF amplifier 16. The RF energy is then coupled to an antenna 17 by conductor 18 through transmit-receiver switch TR. Each of elements 15, 16, 17 and TR is well known in the art, and the connections as shown are known. Echoes received by antenna 17 are passed through TR to the receiver by conductor 20. The usual RF amplification, etc. is obtained by receiver 19, and the processed echoes are passed on to switch SB by conductor 21. Depending on the position of switch SB, the echoes are passed into either up-chirp compressor 22 or down-chirp compressor 23. The compressed echoes from the compressors are passed into detector 24 by conductor 25 and, after detection, are displayed on display device 26. The operation of the various circuits are synchronized by synchronizing circuit 27, through conductors 28, 29, 30 and 31. Switches SA and SB are ganged together and are operated by relay R. It can thus be seen that when up-chirp generator 10 is selected for transmission by switch SA, up-chirp compressor 22 is selected for reception.

Any up-chirp echoes received in up-chirp compressor 22 will be compressed, any down-chirp echoes received therein will be expanded. Down-chirp compressor 23 would operate in converse fashion.

Switches SA and SB alternate between their fixed contacts and cause alternate transmission of up-chirp and down-chirp pulses, and connect the proper compressor 22 or 23 at the proper time.

In the event that a second time around echo from the up-chirp generator 10 is received while down-chirp compressor 23 is connected by switch SB, such echo would be expanded and would not give a false indication on display device 26.

FIGURE 2 shows the exemplary waveforms of up-chirp and down-chirp pulses with respect to time. As can be seen, an up-chirp pulse sweeps up in frequency, and a down-chirp pulse sweeps down in frequency.

FIGURE 1 is shown as illustrative of one particular circuit which may perform the method of the invention. Switches SA and SB could obviously be any of the well known electronic switching devices and have been shown as relay operated for simplicity of the drawing. Also, the up-chirp generator 10 and up-chirp compressor 22 may use the same filter network in opposite directions. The same thing applies to down-chirp generator 11 and down-chirp compressor 23. The invention resides in the method for reducing second time around echoes, rather than any specific apparatus capable of performing the method. Up-chirp compressor 22 and down-chirp compressor 23 may also be called dechirpers.

The method of the invention tends to remove range error due to Doppler effects. Since the up-chirp and down-chirp compressors delay the different frequencies different amounts, a Doppler shift from a moving target will affect the time required for the echoes to pass through the compressors. As radar range is a function of time, the Doppler shift will cause errors in the measured radar range. With the alternate up an down chirping, a range error will be alternately plus and minus, and the Doppler shift error may be removed by averaging two consecutive echoes.

While a specific embodiment of the invention has been described, other embodiments may be obvious to one skilled in the art, in view of the instant disclosure.

I claim:

1. A method of suppressing second time around radar echoes which includes the steps of transmitting by alternately up-chirping and down-chirping and alternately respectively up-dechirping and down-dechirping said echoes.

2. A method of suppressing even order radar echoes comprising the steps of alternately transmitting a first signal swept from a first to a second frequency and transmitting a second signal swept from a third to a fourth frequency, receiving the reflected portion of said first signal and time delaying the frequency components of said portion proportional to the sweep direction of said first and receiving the reflected portion of said second signal and time delaying the frequency components thereof proportional to the sweep direction of said second signal.

3. The method of claim 2 wherein said first and fourth frequencies are equal, and said second and third frequencies are equal.

References Cited
UNITED STATES PATENTS 2,624,876  1/1953  Dicke _____ 343—13
3,249,940  3/1966  Erickson _____ 343—17.1

OTHER REFERENCES

Skolnik, Introduction to Radar Systems, 1962, McGraw-Hill, New York, pp. 129–131.

RODNEY D. BENNETT, *Primary Examiner.*

J. P. MORRIS, *Assistant Examiner.*